C. EASTERLING.
Shifting Carriage-Top.
No. 200,858. Patented March 5, 1878.
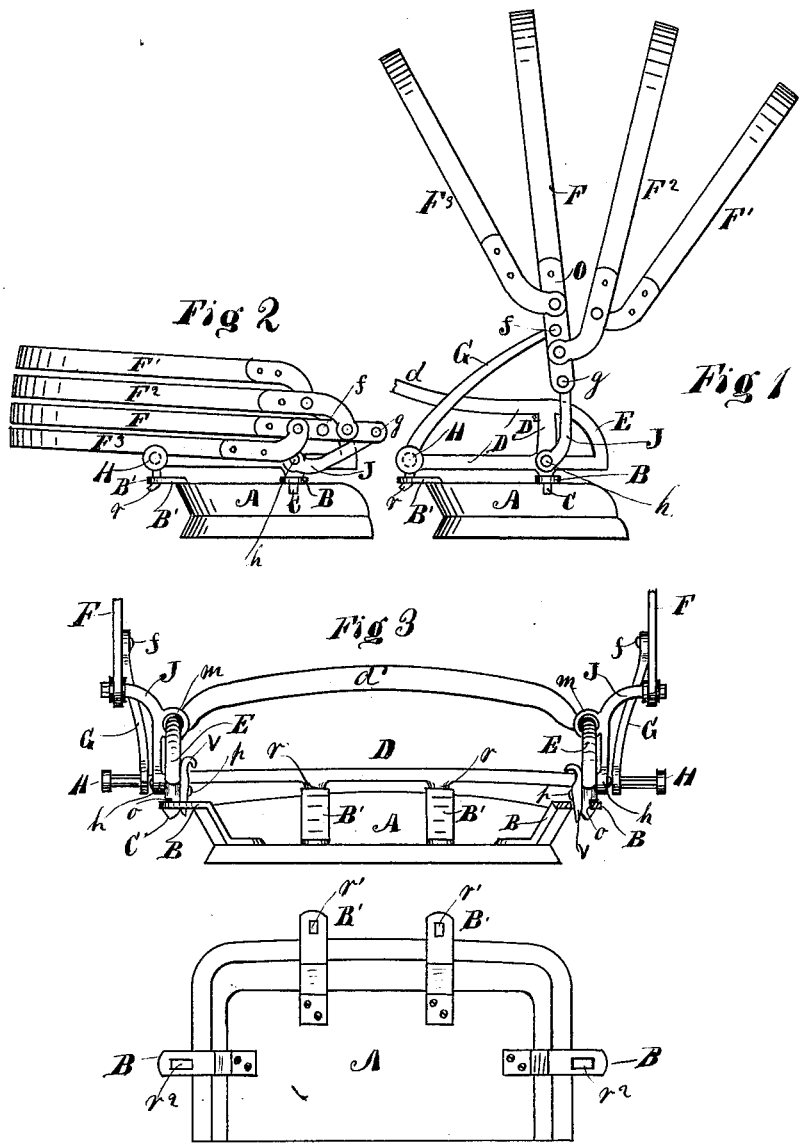

UNITED STATES PATENT OFFICE.

CALEB EASTERLING, OF MARION COUNTY, INDIANA.

IMPROVEMENT IN SHIFTING CARRIAGE-TOPS.

Specification forming part of Letters Patent No. 200,858, dated March 5, 1878; application filed December 17, 1877.

*To all whom it may concern:*

Be it known that I, CALEB EASTERLING, of Marion county, in the State of Indiana, have invented a new and useful Improvement in Shifting Buggy-Tops, which is fully set forth and described in the following specification, and illustrated in the accompanying drawings.

The invention relates principally to the construction and arrangement of devices, and in the new combination of parts, whereby beneficial results are obtained in the manipulation of buggy-tops.

The object of the invention is to furnish facile means of removing a vehicle-top, also of folding the same down, and at the same time drawing it forward so as to allow it to rest and nearly balance on the supporting-stud at the rear and sides of the seat.

The invention consists in the new construction and arrangement of particular parts, and in the new combination of elements which are deemed essential to produce certain results, all of which will hereinafter be fully explained.

In the drawings, in which like letters of reference in the different figures indicate like parts, Figure 1 represents a side elevation of a vehicle-top, attached to a seat, embodying my invention, and shows the top raised. Fig. 2 represents a side elevation of the same, with the top folded down. Fig. 3 represents a front elevation of a seat, and shows a front view of the arrangement of the operating devices; and Fig. 4 is a plan view of the seat, showing the same with the top removed.

A represents any vehicle-seat, to each side and back of which are secured the top-supporting brackets B B B' B', each of which is perforated with holes $r^1$ $r^1$ $r^2$ $r^2$, in the manner shown in Fig. 4.

The shifting-top frame is of peculiar construction, as follows: The rod or bar D extends across the back of the seat, from side to side, its extreme ends H forming a support for the top to rest on when folded down, and also to secure the braces G, and outside braces, that hold the top extended when up. (These latter braces are not shown.) The side rods or bars $D^1$ are united to the bar D at each side of the seat, and extend forward to the front, where they are bent upward with a sharp angle, and form the curved parts E, and extend back and across the rear of the seat, forming the rails $d$ and back-support $d'$, as shown.

The upper side rails $d$ are supported at the rear of the curved parts E by the standard $D^2$, which unites them. Below these standards $D^2$ are projecting lugs C, formed with notches $o$. Said projecting lugs pass through the holes $r^2$ $r^2$ of the brackets B B, and the wedges V, which are attached to the standards $D^2$ by studs $p$ passing through slots formed in the wedges, are forced down into the holes $r^2$ $r^2$, thus forcing the notched part $o$ outward, so as to hook onto the brackets B, and hold the top secure. The rear bar D is also provided with two bent lugs, $r$ $r$, which hook into the rear brackets B', all of which is so arranged that the top, when inserted in the brackets B B', is held firmly to the seat, as shown in Figs. 1, 2, and 3, until it becomes necessary to remove it, which is accomplished by raising the wedges V V out of the holes $r^2$ $r^2$ of the brackets B B, thus releasing the notched parts $o$ of the lug C from the brackets B B, when the top can be inclined back so as to release the hooks $r$ at the rear, and free the top from the seat.

The ends of the main bow F are pivoted at $g$ to the arms J, and these arms are also pivoted to the base of the standards $D^2$ at $h$, which forms the center of the curved parts E, so as to allow the rings or guides $m$, that are attached to the arms J, to operate thereon, as will hereinafter be described.

To the studs H H are pivoted the movable brace-rods G, which extend forward and upward, and are pivoted to the main bow F at $f$, far enough above the pivots $g$ of the arms J as will allow the bow F, when the top is inclined back, to act as a lever on the movable fulcrum $f$, and carry the ends of the bows all forward and downward, following the curved part E, thus allowing the top to fold down and rest on the studs H in such a manner as to nearly balance it and reduce the leverage of the top on the bow-irons and seat. When the top is to be raised, then the braces G also act as movable fulcrums, and the lower ends of the bow F draw the arms J up until they reach the position shown in Fig. 1, where the ordinary side stay-braces (not shown) hold all in position.

I do not confine myself to the precise form of the arms J, provided with loops or wings m, that operate on the curved parts E for the purpose of strengthening the joints, because other forms may be applied that may operate in connection with the brace G and bow F, and produce the same final results.

What I claim as new, and desire to secure by Letters Patent, is—

1. In combination, the arm J, the standard $D^2$, the bow F, and the movable fulcrum-brace G, and stud H, all arranged to be operated in the manner substantially as set forth and described.

2. The combination and arrangement of the arm J and the movable fulcrum-brace G with vehicle-top bows F F and seat A, whereby a forward motion is imparted to the top, when the same is being folded down, in the manner substantially as shown and described.

In testimony whereof I have signed my name to this specification in the presence of two subscribing witnesses.

CALEB EASTERLING.

Witnesses:
E. O. FRINK,
ROBERT W. FURNAS.